(12) United States Patent
Han

(10) Patent No.: US 11,046,525 B2
(45) Date of Patent: Jun. 29, 2021

(54) VEHICLE BODY TRACKING SYSTEM AND METHOD

(71) Applicants: HYUNDAI MOTOR COMPANY, Seoul (KR); KIA MOTORS CORPORATION, Seoul (KR)

(72) Inventor: Sangduck Han, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 49 days.

(21) Appl. No.: 16/701,804

(22) Filed: Dec. 3, 2019

(65) Prior Publication Data

US 2020/0102150 A1  Apr. 2, 2020

Related U.S. Application Data

(62) Division of application No. 15/815,915, filed on Nov. 17, 2017, now Pat. No. 10,532,887.

(30) Foreign Application Priority Data

Jul. 12, 2017 (KR) .................. 10-2017-0088168

(51) Int. Cl.
*B65G 17/20* (2006.01)
*B62D 65/16* (2006.01)
(Continued)

(52) U.S. Cl.
CPC ............. *B65G 17/20* (2013.01); *B62D 65/00* (2013.01); *B62D 65/18* (2013.01); *B65G 35/06* (2013.01);
(Continued)

(58) Field of Classification Search
CPC .................. B62D 65/18; B65G 17/20
See application file for complete search history.

(56) References Cited

U.S. PATENT DOCUMENTS 3,696,946 A * 10/1972 Hunter ............... B65G 47/50
198/349.95
3,744,032 A * 7/1973 Engelberger ......... G05B 19/425
700/159
(Continued)

FOREIGN PATENT DOCUMENTS

CN         2703258 Y     6/2005
CN       101035703 A     9/2007
(Continued)

OTHER PUBLICATIONS

Sun Lin et al, "A Case Study of Assembly Line Balancing in a Commercial Vehicle Company," Industrial Engineering and Management, No. 1, 1007-5429 (2006)01-0110-05, 6 pages.

*Primary Examiner* — Thomas Randazzo
(74) *Attorney, Agent, or Firm* — Brinks Gilson & Lione

(57) ABSTRACT

A vehicle body tracking system of a vehicle assembly line provided at a conveyor unit for transferring a vehicle body may include: a mounting frame to be installed at a power rail of the conveyor unit; a pair of rotating bodies installed at the mounting frame; a driven chain to be combined to the pair of rotating bodies and combined with a drive chain that travels along the power rail; and an encoder sensor installed at the mounting frame and connected to at least one rotating body of the rotating bodies. In particular, the driven chain travels on an endless track, and the encoder sensor detects a rotation amount of the at least one rotating body to output the detected rotation amount to a controller.

9 Claims, 7 Drawing Sheets

(51) Int. Cl.
  *G01D 5/347* (2006.01)
  *B62D 65/00* (2006.01)
  *G05B 19/12* (2006.01)
  *B65G 35/06* (2006.01)
  *B62D 65/18* (2006.01)
  *G05B 19/042* (2006.01)
  *G06K 7/10* (2006.01)

(52) U.S. Cl.
  CPC ......... *G01D 5/3473* (2013.01); *G05B 19/042* (2013.01); *G05B 19/124* (2013.01); *B65G 2201/0294* (2013.01); *G05B 2219/23363* (2013.01); *G06K 7/10762* (2013.01); *G06K 7/10861* (2013.01)

(56) References Cited

U.S. PATENT DOCUMENTS

| | | | | |
|---|---|---|---|---|
| 4,428,708 | A * | 1/1984 | Burt | B65G 1/0421 414/275 |
| 5,069,326 | A * | 12/1991 | Sakamoto | B65G 54/02 198/619 |
| 5,551,552 | A * | 9/1996 | Ophardt | B05B 13/0221 198/465.1 |
| 5,730,048 | A * | 3/1998 | Averill | B41F 5/24 101/37 |
| 2004/0134755 | A1* | 7/2004 | Sticht | B65G 35/06 198/465.2 |
| 2005/0056366 | A1* | 3/2005 | Abe | B27D 1/10 156/307.7 |
| 2005/0111618 | A1* | 5/2005 | Sommer, Jr. | B64F 1/368 378/57 |
| 2007/0018811 | A1* | 1/2007 | Gollu | G01C 21/005 340/539.13 |
| 2008/0135382 | A1* | 6/2008 | Nakamura | B61B 10/02 198/463.2 |
| 2009/0266677 | A1* | 10/2009 | Oppici | B65G 47/841 198/459.6 |
| 2012/0016515 | A1* | 1/2012 | Pfeiffer | G06Q 10/08 700/216 |
| 2015/0248589 | A1* | 9/2015 | Broache | G06K 9/6807 382/182 |
| 2015/0286849 | A1* | 10/2015 | Stimming | G06K 7/0008 340/10.41 |
| 2016/0332823 | A1* | 11/2016 | Yang | B65H 33/16 |

FOREIGN PATENT DOCUMENTS

| | | |
|---|---|---|
| CN | 101198506 A | 6/2008 |
| CN | 101381052 A | 3/2009 |
| CN | 201552111 U | 8/2010 |
| CN | 102141123 A | 8/2011 |
| CN | 103192257 A | 7/2013 |
| CN | 103842127 A | 6/2014 |
| CN | 103846180 A | 6/2014 |
| CN | 204280579 U | 4/2015 |
| CN | 105329338 A | 2/2016 |
| CN | 109413993 A | 3/2019 |
| JP | 2000-025664 A | 1/2000 |
| KR | 10-2006-0118691 A | 11/2006 |
| KR | 10-2007-0039268 A | 11/2007 |

* cited by examiner

VEHICLE BODY TRACKING SYSTEM AND METHOD

CROSS-REFERENCE TO RELATED APPLICATION

This application is a divisional application of non-provisional U.S. patent application Ser. No. 15/815,915, filed on Nov. 17, 2017, which claims priority to and the benefit of Korean Patent Application No. 10-2017-0088168, filed on Jul. 12, 2017, the entirety of which are incorporated herein by reference.

FIELD

The present disclosure relates to a vehicle assembly system. More particularly, the present disclosure relates to a vehicle body tracking system and method of a vehicle assembly line.

BACKGROUND

The statements in this section merely provide background information related to the present disclosure and may not constitute prior art.

Generally, in a chassis process, a trim process, and a final process of a design assembly line of a vehicular mass production plant, design parts including various internal and external design parts of a vehicle are assembled to a vehicle body.

That is, in a chassis process line, a trim process line, and a final process line of the design assembly process, various parts are assembled to the vehicle body. In each of these design process lines, for example, a hanger assembly (also referred to as "P&F conveyor" in the art) is used to transfer the vehicle body along a predetermined transferring section to mount the parts on the vehicle body.

In this case, in each of the design process lines, a vehicle body entering a process pitch section divided by an interval set along the transferring direction of the vehicle body is detected. As a device for detecting the vehicle body, there may be a barcode scanner that detects a barcode attached to the vehicle body and identifies a vehicle identification number of the vehicle body.

Therefore, in the prior art, the barcode of the vehicle body entering each design process line is scanned through the barcode scanner, thus it is possible to detect in which process pitch interval the vehicle body is positioned in each design process line.

However, we have discovered that the conventional bar code scanner simply detects whether the vehicle has entered the process pitch section of the design process line, but cannot accurately determine a position of the vehicle in the design process line. In the related art, the effectiveness of assembling history management is undermined.

The above information disclosed in this Background section is only for enhancement of understanding of the background of the present disclosure and therefore it may contain information that does not form the prior art that is already known to a person of ordinary skill in the art.

SUMMARY

The present disclosure provides a vehicle body tracking system and method of a vehicle assembly line that may precisely determine positions of vehicle bodies transferred to preset process sections of the assembly line in real time.

An exemplary form of the present disclosure provides a vehicle body tracking system of a vehicle assembly line for determining, in real time, a position of a vehicle body transferred to process sections divided by a predetermined pitch along an assembly line of a vehicle. The vehicle body tracking system includes: a vehicle body detecting unit configured to be installed at a starting point of the vehicle assembly line and configured to detect the vehicle body; an encoder unit provided at a conveyor unit that travels along the assembly line and transfers the vehicle body and configured to detect a rotation amount of a rotating body rotated by a traveling body of the conveyor unit; and a controller configured to receive a detection signal from the vehicle body detecting unit to acquire identification information of the vehicle body and configured to calculate a moving distance of the vehicle body for each process section by receiving the detection signal from the encoder unit.

The vehicle body detecting unit may include a barcode scanner that recognizes a barcode attached to the vehicle body.

The barcode scanner may scan the barcode, generate a vehicle identification number of the vehicle body, and transmit the vehicle identification number to the controller.

The controller may display the vehicle identification number and the moving distance of the vehicle body, and a process section, according to the moving distance through a display unit.

The controller may reset a detection value of the encoder unit to zero (0) when the detection value detected by the encoder unit corresponds to the predetermined pitch of the process section.

Another form of the present disclosure provides a vehicle body tracking system of a vehicle assembly line provided at a conveyor unit for transferring a vehicle body along a vehicle assembly process line. The vehicle body tracking system includes: a mounting frame configured to be installed at a power rail of the conveyor unit; a pair of rotating bodies configured to be rotatably installed at the mounting frame; a driven chain configured to be combined to the pair of rotating bodies and a drive chain configured to travel along the power rail, the driven chain configured to travel on an endless track; and an encoder sensor installed at the mounting frame and configured to be connected to at least one rotating body of the rotating bodies, the encoder sensor configured to detect a rotation amount of the at least one rotating body to output the detected rotation amount to a controller.

The controller may receive the detected rotation amount from the encoder sensor and calculate a moving distance of the vehicle body for each process section.

The rotating body may include a sprocket engaged with the driven chain.

The driven chain may include a caterpillar chain.

Combination grooves combined with teeth of the sprocket may be continuously formed at an inner circumference of the caterpillar chain, and guide protrusions combined with the drive chain may be continuously formed at an outer circumference of the caterpillar chain.

The encoder sensor may be provided to be connected to a center of each rotating body.

The controller may receive the detected rotation amount from one of the encoder sensors connected to the rotating body.

A pair of chain guides guiding the traveling of the driven chain may be installed at the mounting frame.

The pair of chain guides may be disposed to face each other inside the driven chain.

The chain guide may be movably installed at the mounting frame through a guide rod.

The guide rod may be provided with a pressing spring pressing the chain guide in an outward direction of the driven chain.

The vehicle body tracking system of the vehicle assembly line may further include a take-up unit configured to be provided at the mounting frame to be connected to one of the rotating bodies and configured to apply tension to the driven chain through the rotating body.

The take-up unit may include a floating frame fixedly installed at the mounting frame, a pair of guide bars provided at the floating frame, a floating block slidably combined to the guide bar and rotatably supporting the rotating body, a floating spring installed at the guide bar between one side of the floating frame and one side of the floating block, and a tension adjusting bolt fastened to another side of the floating frame and supporting another side of the floating block.

Yet another form of the present disclosure provides a vehicle body tracking method for a vehicle assembly line for determining, in real time, a position of a vehicle body transferred by a conveyor unit to process sections divided by a predetermined pitch along an assembly line of a vehicle. The tracking method may include steps of: (a) setting a starting point of the assembling process line as a reference position and generating a vehicle identification number of a vehicle body through a vehicle body detecting unit at the reference position; (b) detecting a rotation amount of a rotating body rotated by a traveling body of the conveyor unit through an encoder unit; (c) calculating a moving distance of the vehicle body for each process section by receiving the detected rotation amount from the encoder unit; and (d) displaying, on a display unit, the vehicle identification number, the moving distance of the vehicle body, and a process section based on the moving distance.

The step (a) may include scanning a barcode attached to the vehicle body through a barcode scanner and generating the vehicle identification number of the vehicle body.

The step (b) may include resetting a detection value of the encoder unit to zero (0) when the detection value detected by the encoder unit corresponds to the predetermined pitch of the process section.

The step (c) may include calculating a moving distance of the vehicle body through a formula of $A+(N \times B)+C$, where a position value of the reference position is referred to as "A", a reset number of an encoder sensor is referred to as "N", a pitch value of the process section is referred to as "B", and a distance value according to the detected rotation amount of the encoder sensor is referred to as "C".

The step (d), when a start process section at the reference position is displayed as a first process section through the display unit, may include displaying subsequent process sections as N+1 process sections through the display unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
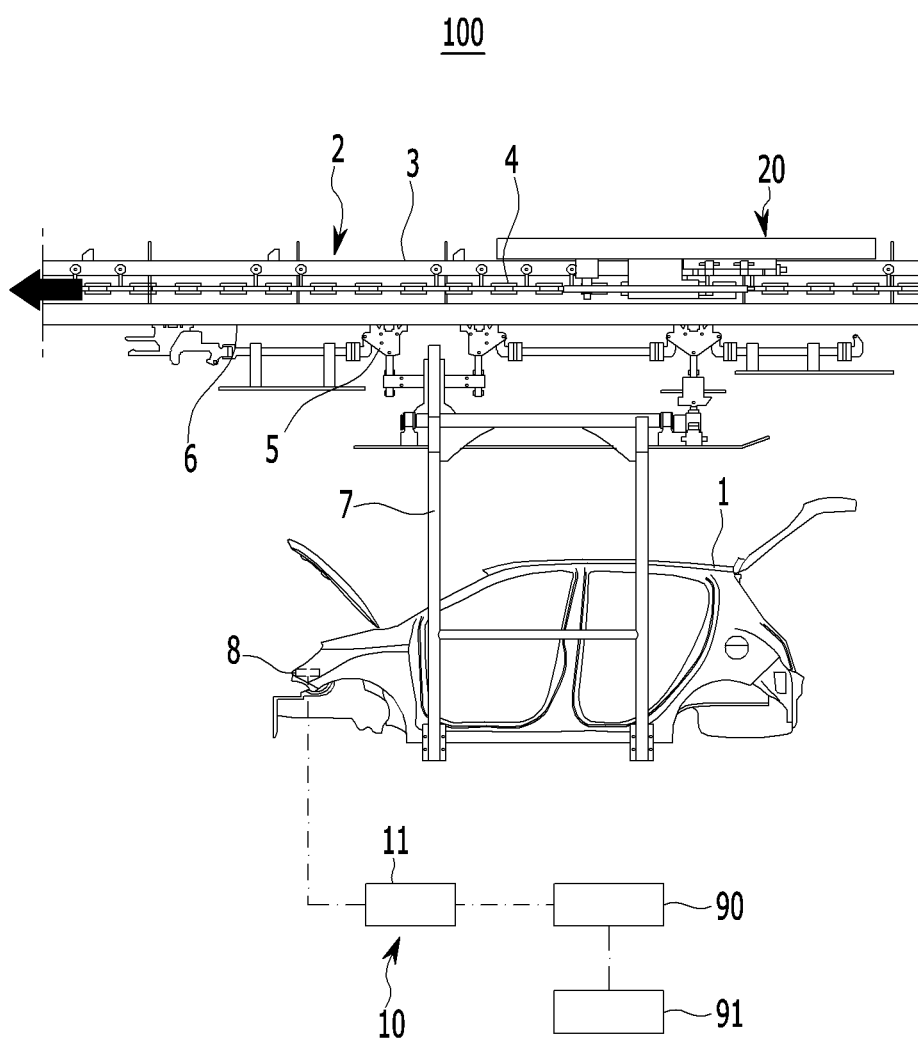
FIG. 1 illustrates a schematic view of a vehicle body tracking system of a vehicle assembly line.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a schematic view of a vehicle body tracking system of a vehicle assembly line in an exemplary form of the present disclosure.

Referring to FIG. 1, a vehicle body tracking system 100 of a vehicle assembly line may be applied to a vehicle production process in which various parts are fastened and assembled to a vehicle body 1 that is transferred by predetermined intervals by a conveyor.

For example, the vehicle body tracking system 100 of the vehicle assembly line may be applied to a design assembling process in which parts such as an engine, a transmission, and a suspension device are assembled to corresponding assembly positions of the vehicle body 1 in a chassis process line and a trim process line, and in which other parts are assembled to the vehicle body 1 in a finishing process line.

However, the scope of the present disclosure is not limited to the vehicle production process in which parts are assembled to the vehicle body 1, but a technical scope of the present disclosure may be applied thereto if various parts are assembled to various kinds and types of structures in the process.

Generally, in the related art, a vehicle body transferring direction is referred to as a T direction, a vehicle width direction is referred to as an L direction, and a height direction of the vehicle body is referred to as an H direction. However, in the exemplary form of the present disclosure, a reference direction is not based on the above-mentioned LTH directions, but on a vehicle body transferring direction, a vehicle body height direction, and a vehicle width direction.

Assembly process lines such as the chassis process line, the trim process line, and the design process line as described above include a conveyor unit 2 for transferring the vehicle body 1 to a process section divided by a predetermined constant pitch.

Here, the process section corresponds to a section in which the assembly process line is divided by a predetermined constant pitch along the transferring direction of the vehicle body 1, and different parts may be assembled to the vehicle body 1 in each process section.

The conveyor unit 2 is also referred to as a P&F chain conveyor in the art, and it includes a power rail 3 disposed along the assembly process line and a drive chain 4 traveling on an endless track along the power rail 3 by a drive motor. The conveyor unit 2 includes a hanger 7 connected to the drive chain 4 through a hanger carrier 5 and transferring the vehicle body 1 along a free rail 6.

The conveyor unit 2 corresponds to a P&F chain conveyor that is well-known and disclosed, for example, in Korean Patent Publication No. 2006-0118691, which is incorporated herein by reference. Thus, in the present specification, a detailed description thereof will be omitted.

The vehicle body tracking system 100 of the vehicle assembly line in one form of the present disclosure has a structure capable of precisely determining positions of vehicle bodies 1 transferred to the process sections of the assembly process line in real time.

For this, the vehicle body tracking system 100 of the vehicle assembly line includes a vehicle body detecting unit 10, an encoder unit 20, and a controller 90.

The vehicle body detecting unit 10, which detects the vehicle bodies 1 entering the assembly process line, is installed at a starting position of the assembly process line.

The vehicle body detecting unit 10 may include a barcode scanner 11 capable of recognizing a barcode 8 attached to the vehicle body 1 and identifying unique information (a vehicle identification number) of the vehicle body 1. The barcode scanner 11 may scan the bar code 8 of the vehicle body 1 and generate the vehicle identification number of the vehicle body 1.

In addition, the barcode scanner 11 may generate order information of the vehicle body 1 by using the vehicle identification number. The barcode scanner 11 transmits the generated vehicle identification number and order information to the controller 90.

The barcode scanner 11 corresponds to a barcode reader that is well-known in the art, so in the present specification, a detailed description thereof will be omitted.

The encoder unit 20 detects a rotation amount of a rotating body rotated by a traveling body of the conveyor unit 2, that is, the drive chain 4. The encoder unit 20 is substantially included in the conveyor unit 2.

Figure 2:
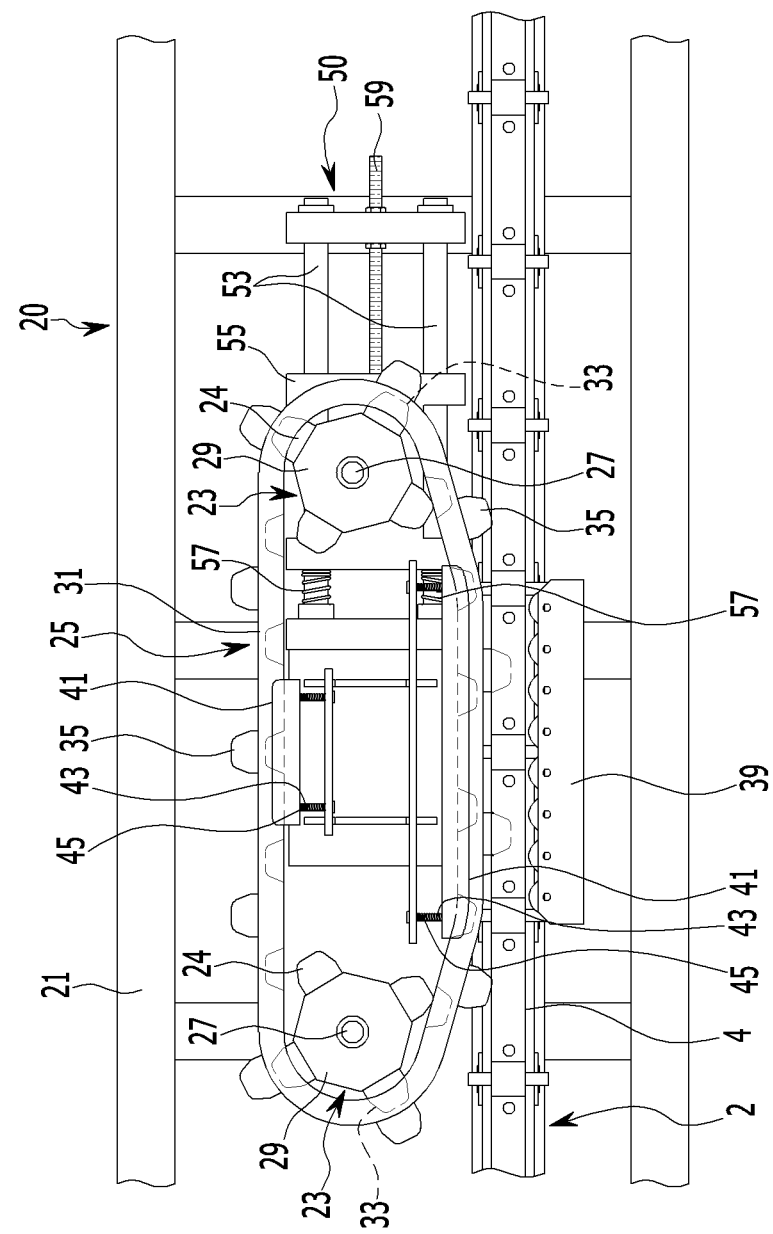
FIG. 2 illustrates a bottom view of an encoder unit applied to a vehicle body tracking system of a vehicle assembly line.
Figure 3:
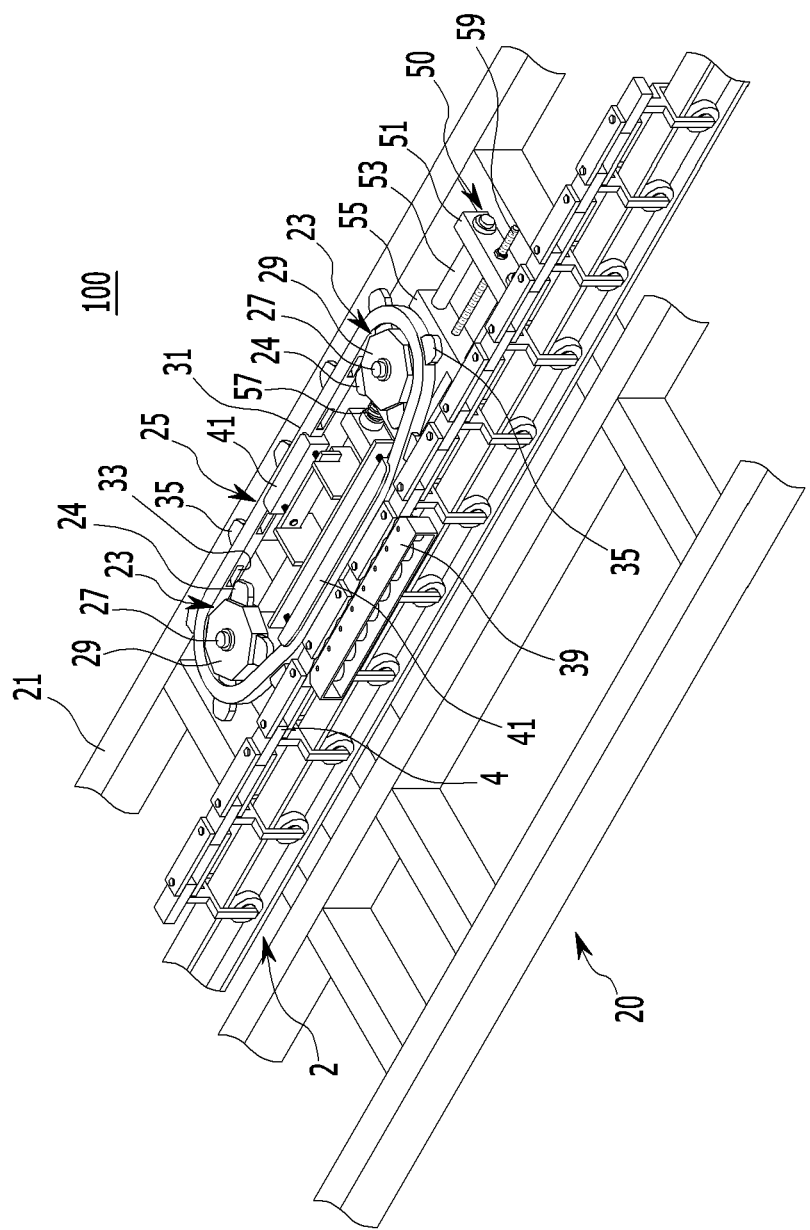
FIG. 3 illustrates a perspective view of an encoder unit applied to a vehicle body tracking system of a vehicle assembly line.

FIG. 2 illustrates a bottom view of an encoder unit applied to a vehicle body tracking system of a vehicle assembly line as an exemplary form of the present disclosure, and FIG. 3 illustrates a perspective view of an encoder unit applied to a vehicle body tracking system of a vehicle assembly line in one form of the present disclosure.

Referring to FIG. 2 and FIG. 3 together with FIG. 1, the encoder unit 20 includes a mounting frame 21, a rotating body 23, a driven chain 25, and an encoder sensor 27.

The mounting frame 21 mounts constituent elements described later, and it is installed at the power rail 3 of the conveyor unit 2. The mounting frame 21 is disposed at the power rail 3 along the vehicle body transferring direction. In addition, the mounting frame 21 may be formed as one frame or two or more divided frames.

The mounting frame 21 may include various parts such as a bracket, a bar, a rod, a plate, a block, a rail, a collar, and the like for supporting constituent elements described later.

Since the various parts are those for installing each constituent element at the mounting frame 21 described in detail later, they are generally referred to as the mounting frame 21 except in special cases.

A pair of rotating bodies 23 are rotatably installed at the mounting frame 21 with a predetermined interval therebetween. The rotating body 23 includes a sprocket 29 having sprocket teeth 24 engaged with the driven chain 25.

The driven chain 25 is connected to the pair of rotating bodies 23 so as to be able to travel on an endless track. The driven chain 25 is combined with the drive chain 4 traveling along the power rail 3 of the conveyor unit 2 The driven chain 25 includes a caterpillar chain 31.

Combination grooves 33 combined with the sprocket teeth 24 of the sprocket 29 are continuously formed at an inner circumference of the caterpillar chain 31. Guide protrusions 35 combined with the drive chain 4 are continuously formed at an outer circumference of the caterpillar chain 31.

Accordingly, when the drive chain 4 transfers the vehicle bodies 1 to the process section of the assembly process line through the hanger 7 while traveling, the caterpillar chain 31 is combined with the drive chain (4) through the guide protrusion 35 and travels on an endless track through the sprocket 29. In addition, the caterpillar chain 31 is combined with the sprocket teeth 24 of the sprocket 29 through the combination grooves 33 and rotates the sprocket 29.

Reference numeral 39 which is not explained in the drawings denotes a guide roller assembly installed at the mounting frame 21. The guide roller assembly 39 guides traveling of the drive chain 4, and has a plurality of guide rollers for inhibiting drooping and separation of the drive chain 4.

The encoder sensor 27 detects a rotation amount of the sprocket 29 as a pulse value and outputs the detected value to the controller 90, and it is installed at the mounting frame 21 so as to be connected to at least one of the pair of sprockets 29.

For example, the encoder sensor 27 is provided to be connected to a center of each sprocket 29 and includes a sensor end which is connected to the sprocket 29. The sensor end may be rotated together with the sprocket 29 in a state of being fixed to the sprocket 29, or may be positioned at a center of the sprocket 29 in a state of being fixed to a separate stationary body.

The encoder sensor 27 corresponds to a photoelectric linear encoder sensor or a rotary encoder sensor that is well-known in the art, so in the present specification, a detailed description thereof will be omitted.

In one form, the mounting frame 21 is provided with a pair of chain guides 41 for guiding the traveling of the caterpillar chain 31. The pair of chain guides 41 are disposed to face each other inside the caterpillar chain 31.

The chain guide 41 supports an inside portion of the caterpillar chain 31 traveling on an endless track, and functions to inhibit drooping and separation of the caterpillar chain 31.

Further, for inhibiting the drooping or the separation of the caterpillar chain 31, the chain guide 41 is movably installed in a direction in which it is moved away from or closer to the mounting frame 21 through a pair of guide rods 43.

In this case, the guide rod 43 is provided with a pressing spring 45 for pressing the chain guide 41 in an outward direction of the caterpillar chain 31. The chain guide 41 may press the caterpillar chain 31 outwardly with resilient force of the pressure spring 45 and may inhibit or prevent the caterpillar chain 31 from drooping or being separated from the drive chain 4.

In another form, the vehicle body tracking system 100 of the vehicle assembly line further includes a take-up unit 50 for applying tension to the caterpillar chain 31 through the sprocket 29.

Figure 4:
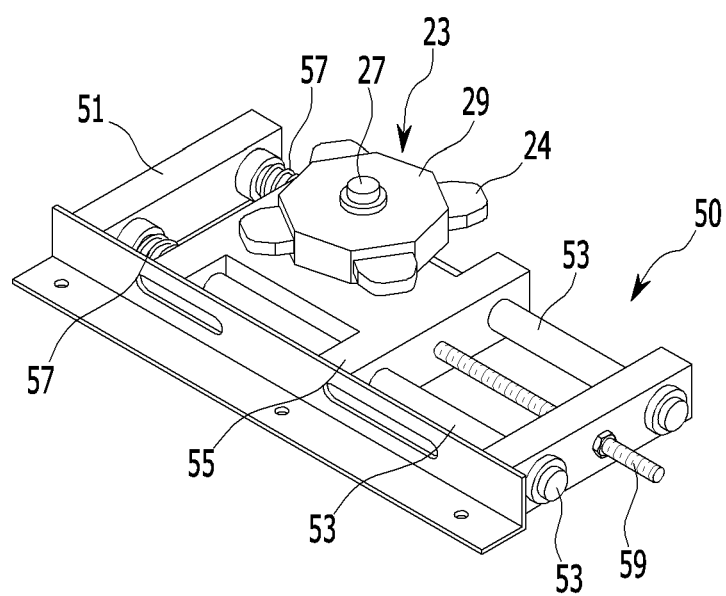
FIG. 4 illustrates a perspective view of a take-up unit applied to a vehicle body tracking system of a vehicle assembly line.

FIG. 4 illustrates a perspective view of a take-up unit applied to a vehicle body tracking system of a vehicle assembly line in an exemplary form of the present disclosure.

Referring to FIG. 2 to FIG. 4, the take-up unit 50 is provided at the mounting frame 21 so as to be connected to one of the sprockets 29. The take-up unit 50 has a structure that may inhibit floating of the sprocket 29, inhibit drooping of the caterpillar chain 31, and absorb a sudden overload of the caterpillar chain 31.

For this, the take-up unit 50 includes a floating frame 51, a pair of guide bars 53, a floating block 55, a floating spring 57, and a tension adjusting bolt 59.

The floating frame 51 is fixedly installed to the mounting frame 21 and is disposed in the vehicle body transferring direction. The pair of guide bars 53 are fixedly installed to the floating frame 51 in the vehicle body transferring direction.

The floating block 55 rotatably supports the sprocket 29, and is slidably combined to the guide bar 53 in the vehicle body transferring direction. The floating spring 57 is installed at the guide bar 53 between one side of the floating frame 51 and one side of the floating block 55. The tension adjusting bolt 59 is bolted to another side of the floating frame 51, and supports another side of the floating block 55.

In one form, the controller 90 (refer to FIG. 1) includes a program, such as control logic, that controls an overall operation of the vehicle body tracking system 100.

The controller 90 receives a signal from the barcode scanner 11 of the vehicle body detecting unit 10 to acquire a vehicle identification number of the vehicle body 1, and receives a rotation amount detection value of the sprocket 29 from the encoder sensor 27 of the encoder unit 20 to calculate a moving distance of the vehicle body 1 for each process section.

In another form, the controller 90 may calculate the moving distance of the vehicle body 1 for each process section by receiving the rotation amount detection value of the sprocket 29 from one of the encoder sensors 27 provided in the sprockets 29.

When the controller 90 determines that one of the encoder sensors 27 provided in sprockets 29 is malfunctioning, the controller 90 may receive the rotation amount detection value of the sprocket 29 from the encoder sensor 27 provided in another sprocket 29 to calculate the moving distance of the vehicle body 1 for each process section.

In addition, the controller 90 may reset the detection value of the encoder sensor 27 to 0 when a detection value corresponding to the pitch of the process section is detected by the encoder sensor 27 of the encoder unit 20. This is to increase a lifespan and detection accuracy of the encoder sensor 27.

Further, the controller 90 may display the vehicle identification number and the moving distance of the vehicle body 1, and the process section according to the moving distance, through a display unit 91.

Hereinafter, operations of the vehicle body tracking system 100 of the vehicle assembly line according to the exemplary form of the present disclosure and the vehicle body tracking method for the vehicle assembly line will be described in detail with reference to previously described drawings and other accompanying drawings.

Figure 5:
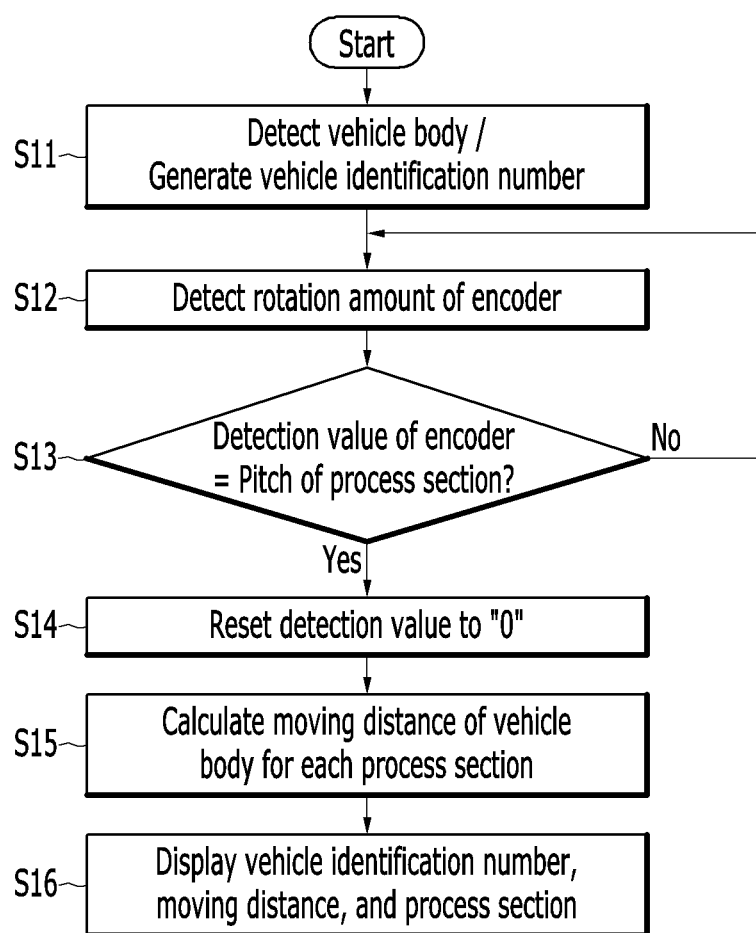
FIG. 5 illustrates a flowchart of a vehicle body tracking method for a vehicle assembly line.

FIG. 5 illustrates a flowchart of a vehicle body tracking method for a vehicle assembly line in an exemplary form of the present disclosure.

Referring to FIG. 5 in addition to the above-described drawings, the vehicle body 1 transferred through a buffer section of the design assemble line enters into the assembly process line, for example, the chassis process line, the trim process line, the final process line, and the like. In this case, the assembly process line is continuously divided so that the process sections of the pitch set along the vehicle body transferring direction are provided therein.

In one form, the vehicle bodies 1 are transferred to the process sections of the assembly process line through the conveyor unit 2, and in this case, the drive chain 4 first travels on the endless track along the power rail 3 by a drive motor. The guide roller assembly 39 guides the traveling of the drive chain 4 and inhibits the drive chain 4 from drooping and being separated.

Therefore, the hangers 7 connected to the drive chain 4 through the hanger carrier 5 may be transferred along the free rail 6 in a process advancing direction, and the vehicle body 1 mounted on the hanger 7 may be transferred in the process advancing direction.

In this case, a starting point of the assembly line is set as a reference position, and the bar code 8 of the vehicle body 1 is scanned through the barcode scanner 11 of the vehicle body detecting unit 10 at the reference position to generate the vehicle identification number of the vehicle body 1 and to transmit the vehicle identification number to the controller 90 (S11).

During transferring of the vehicle body 1 through the conveyor unit 2 to the process section of the assembling process line, the caterpillar chain 31 is combined with the drive chain 4 through the guide protrusion 35 and travels on the endless track through the sprockets 29. In addition, the caterpillar chain 31 is combined with the sprocket teeth 24 of the sprockets 29 through the combination groove 33 and rotates the sprockets 29.

The caterpillar chain 31 is guided along the pair of chain guides and travels on an endless track. In this case, the chain guide 41 may press the caterpillar chain 31 outwardly with elastic force of the pressing spring 45 and may inhibit the caterpillar chain 31 from drooping or being separated from the drive chain 4.

In addition, it is possible to inhibit the floating of the sprocket 29 through the take-up unit 50, to inhibit the caterpillar chain 31 from drooping, and to absorb a sudden overload of the caterpillar chain 31.

That is, since the floating block 55 rotatably supporting the sprocket 29 is supplied with the elastic force of the floating spring 57 in a state in which the floating block 55 is slidably combined with the guide bar 53, it is possible to inhibit the floating and drooping of the sprocket 29 while applying tension to the caterpillar chain 31, and it is possible to absorb an overload applied to the caterpillar chain 31.

In this case, the rotation amount of the sprocket 29 is detected as a pulse value through the encoder sensor 27, and the detected pulse value is output to the controller 90 (S12).

When a detection value corresponding to the pitch of the process section is detected through the encoder sensor 27 (S13), the controller 90 resets the detected pulse value through the encoder sensor 27 to 0 (S14). Then, the controller 90 calculates the moving distance of the vehicle body for each process section of the assembly process line based on the detected value received from the encoder sensor 27 (S15).

In this process, assuming that a position value of the above-mentioned reference position is referred to as "A", a reset number of the encoder sensor 27 is referred to as "N", a pitch value of the process section is referred to as "B", and a distance value according to the rotation amount detection value of the encoder sensor 27 is referred to as "C", a moving distance of the vehicle body 1 is calculated by a formula of A+(N×B)+C.

Figure 6:
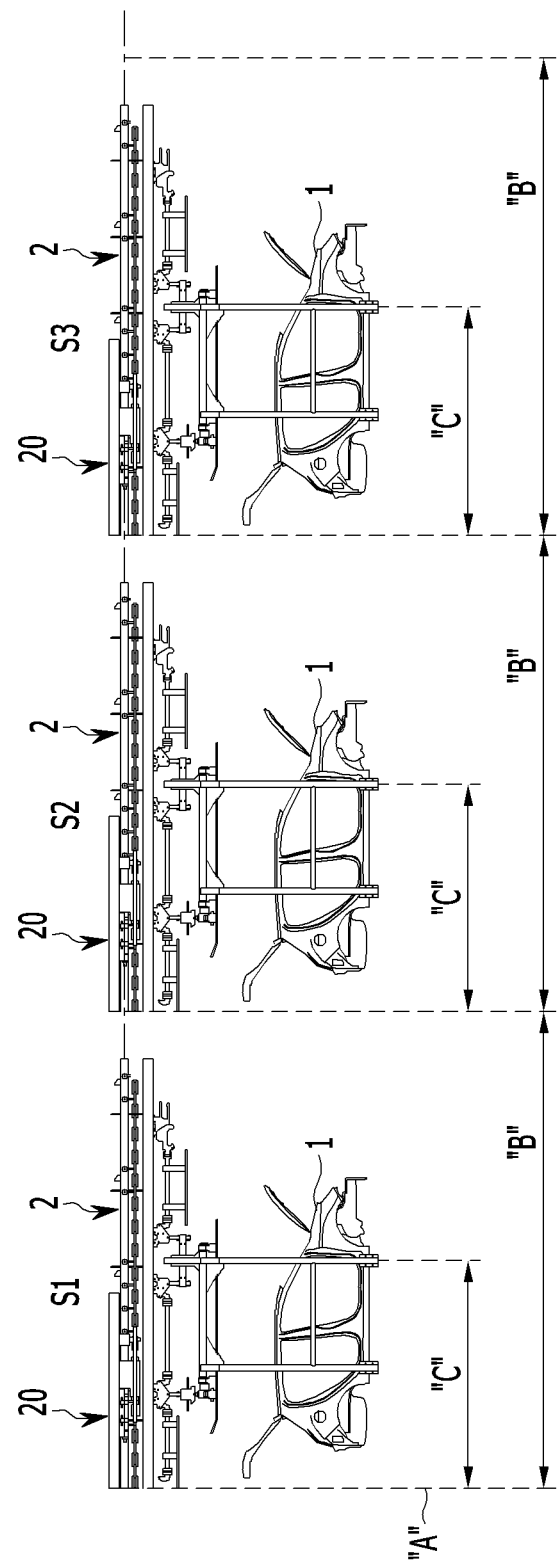
FIG. 6 and FIG. 7 illustrate schematic views for explaining a vehicle body tracking method for a vehicle assembly line.

For example, as shown in FIG. 6, when a start process section at the reference position is referred to as a first process section (S1) and subsequent process sections are referred to as second, third, . . . , etc. process sections (S2, S3, . . . ), the vehicle body 1 may be positioned in the third process section S3 by the conveyor unit 2. In this case, when a detection value corresponding to each pitch of the first and second process sections S1 and S2 is detected through the encoder sensor 27, the controller 90 resets the encoder sensor 27 two times.

Therefore, the controller 90 may calculate the moving distance (mm) of the vehicle body 1 by the formula of A+(2×B)+C, wherein "C" represents a distance value according to the rotation amount detection value in the third process section S3.

In a case that the vehicle body 1 is positioned in the second process section S2 by the conveyor unit 2, when a detection value corresponding to the pitch of the first processing section S1 is detected through the encoder sensor 27, the controller 90 resets the encoder sensor 27 once.

Therefore, the controller 90 may calculate the moving distance (mm) of the vehicle body 1 by the formula of A+(1×B)+C, wherein "C" represents a distance value according to the rotation amount detection value in the third process section S2.

In addition, when the vehicle body 1 is positioned in the first process section S by the conveyor unit 2, since the detection value corresponding to the pitch of the first processing section S1 is not detected through the encoder sensor 27, the controller 90 does not reset the encoder sensor 27.

Therefore, the controller 90 may calculate the moving distance (mm) of the vehicle body 1 by the formula of A+(0×B)+C, wherein "C" represents a distance value according to the rotation amount detection value in the third process section S1.

Accordingly, in the exemplary form of the present disclosure, the moving distance of the vehicle body 1 positioned in the respective process sections may be calculated in the manner described above.

Figure 7:
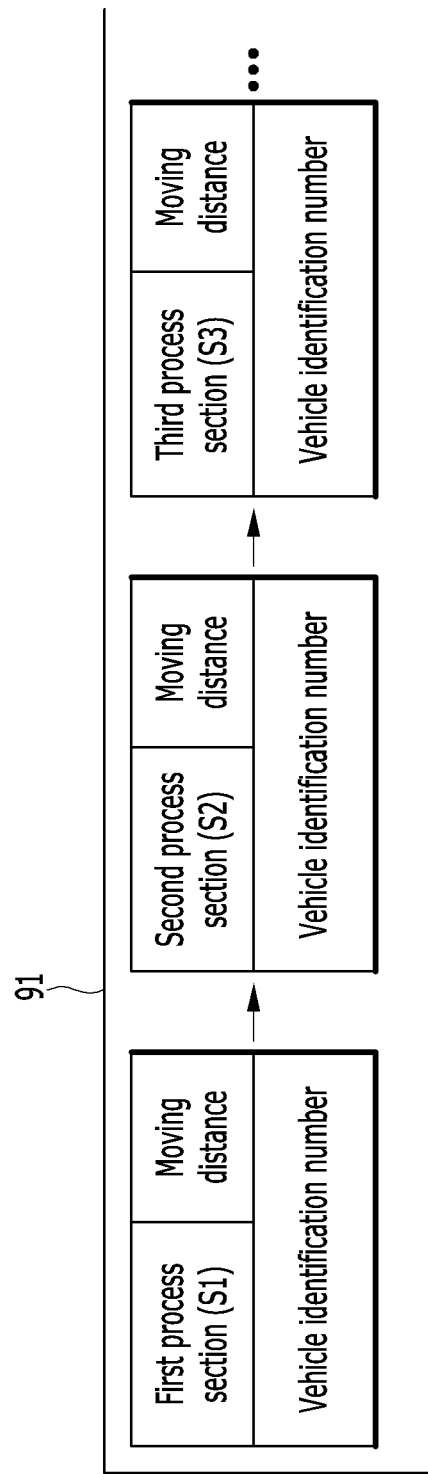

As shown in FIG. 7, the controller 90 displays respective vehicle identification numbers and moving distances of the vehicle bodies 1 and respective process sections according to the moving distance of the vehicle bodies 1 received from the bar code scanner 11, through the display unit 91 (S16).

In step S16, when a start process section at the reference position is displayed as the first process section S1 through the display section 91, subsequent process sections are displayed as the second, third, . . . (which are a reset number (N)+1 of the encoder sensor) sections (S2, S3, . . . ) through the display section 91.

According to the vehicle body tracking system and method of the vehicle assembly line according to the exemplary form of the present disclosure described above, the position of the vehicle body 1 transferred to the set process sections of the assembly process line may be accurately determined in real time through the encoder unit 20, thus it is possible to improve the assembly history management with high effectiveness and accuracy in the processes of fastening and assembling various parts to the vehicle body 1.

While the present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A vehicle body tracking system of a vehicle assembly line provided at a conveyor unit for transferring a vehicle body along a vehicle assembly process line, the vehicle body tracking system comprising:
   a mounting frame configured to be installed at a power rail of the conveyor unit;
   a pair of rotating bodies installed at the mounting frame;
   a driven chain configured to be combined to the pair of rotating bodies and combined with a drive chain that is configured to travel along the power rail, the driven chain configured to travel on an endless track; and
   an encoder sensor installed at the mounting frame and configured to be connected to at least one rotating body of the rotating bodies, the encoder sensor configured to detect a rotation amount of the at least one rotating body to output the detected rotation amount to a controller.

2. The vehicle body tracking system of the vehicle assembly line of claim 1, wherein the controller is configured to receive the detected rotation amount from the encoder sensor and to calculate a moving distance of the vehicle body for each processing section.

3. The vehicle body tracking system of the vehicle assembly line of claim 1, wherein the at least one rotating body includes a sprocket engaged with the driven chain.

4. The vehicle body tracking system of the vehicle assembly line of claim 3, wherein:
   the driven chain includes a caterpillar chain, and
   combination grooves combined with teeth of the sprocket are continuously formed at an inner circumference of the caterpillar chain, while guide protrusions combined with the drive chain are continuously formed at an outer circumference of the caterpillar chain.

5. The vehicle body tracking system of the vehicle assembly line of claim 1, wherein:
   a plurality of encoder sensors is provided to be connected to a center of each rotating body, and
   the controller is configured to receive the detected rotation amount from at least one encoder sensor of the plurality of encoder sensors connected to the rotating body.

6. The vehicle body tracking system of the vehicle assembly line of claim 1, wherein:
   a pair of chain guides configured to guide the traveling of the driven chain are installed at the mounting frame, and
   the pair of chain guides are disposed to face each other inside the driven chain.

7. The vehicle body tracking system of the vehicle assembly line of claim 6, wherein:
   The pair of chain guides are movably installed at the mounting frame by a guide rod, and
   the guide rod is provided with a pressing spring configured to press the pair of chain guides in an outward direction of the driven chain.

8. The vehicle body tracking system of the vehicle assembly line of claim 1, further comprising
   a take-up unit provided at the mounting frame to be connected to one of the rotating bodies and configured to apply tension to the driven chain through the rotating body.

9. The vehicle body tracking system of the vehicle assembly line of claim 8, wherein the take-up unit includes:
   a floating frame fixedly installed at the mounting frame, a pair of guide bars provided at the floating frame, a floating block slidably combined to the guide bars and rotatably supporting the rotating body, a floating spring installed at the guide bars between one side of the floating frame and one side of the floating block, and a tension adjusting bolt fastened to another side of the floating frame and configured to support another side of the floating block.

* * * * *